United States Patent [19]

Hostetler

[11] 3,924,765

[45] Dec. 9, 1975

[54] HYDRAULIC SIDE LIFT LOADER

[76] Inventor: Dewey L. Hostetler, R.R. No. 2, Box 4, Harper, Kans. 67058

[22] Filed: Mar. 1, 1974

[21] Appl. No.: 447,076

[52] U.S. Cl. ............... 214/518; 214/80; 214/83.36; 198/7 BL
[51] Int. Cl.² .......................................... B60P 1/38
[58] Field of Search ............ 214/80, 518, 519, 520, 214/521, 522, 83.36; 198/7 BL

[56] References Cited
UNITED STATES PATENTS

| 367,278 | 7/1887 | Dwelley | 214/80 |
|---|---|---|---|
| 2,201,088 | 5/1940 | Hamon | 214/80 |
| 2,757,807 | 8/1956 | Ringness | 214/80 |
| 2,772,007 | 11/1956 | Johnson | 214/80 |
| 2,971,661 | 2/1961 | Isaacs, Jr. | 214/80 |
| 3,341,039 | 9/1967 | Cranage | 198/7 BL X |
| 3,679,081 | 7/1972 | Duncan, Jr. | 214/522 |

FOREIGN PATENTS OR APPLICATIONS

| 83,768 | 6/1957 | Denmark | 214/80 |

*Primary Examiner*—Albert J. Makay
*Attorney, Agent, or Firm*—John H. Widdowson

[57] ABSTRACT

A bale loader and carrier for cylindrical bales is a vehicle. A conveyor is mounted on the bed to move a bale on the bed. A frame is mounted on the vehicle pivotal from a generally horizontal position at the side to a generally upright position. The frame receives a cylindrical bale in a lifting position. In use the loader and carrier receives a cylindrical bale with the frame and lifts same onto the bed. The conveyor is used to move the bale along the bed and remove the bale from the vehicle.

8 Claims, 10 Drawing Figures

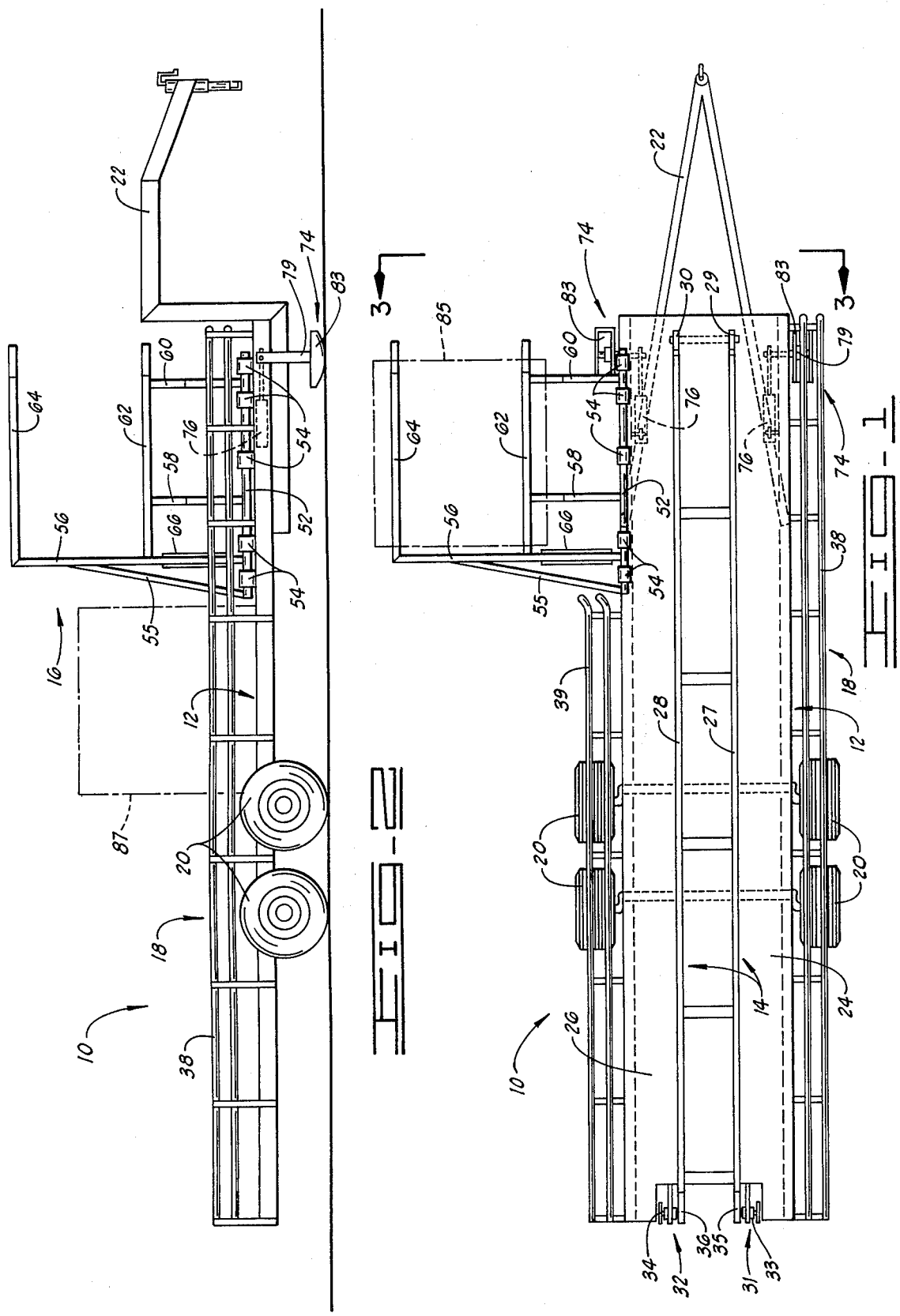

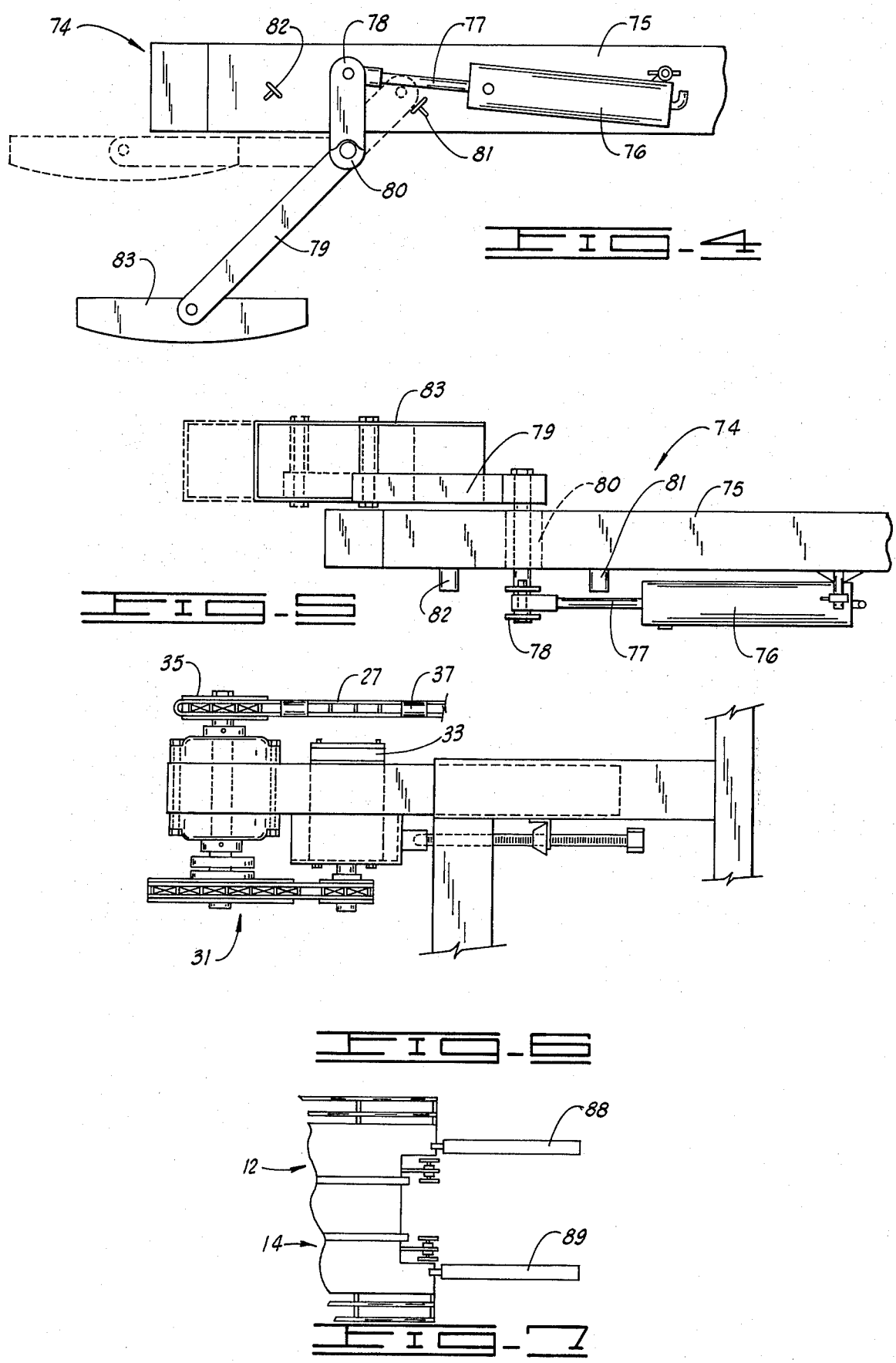

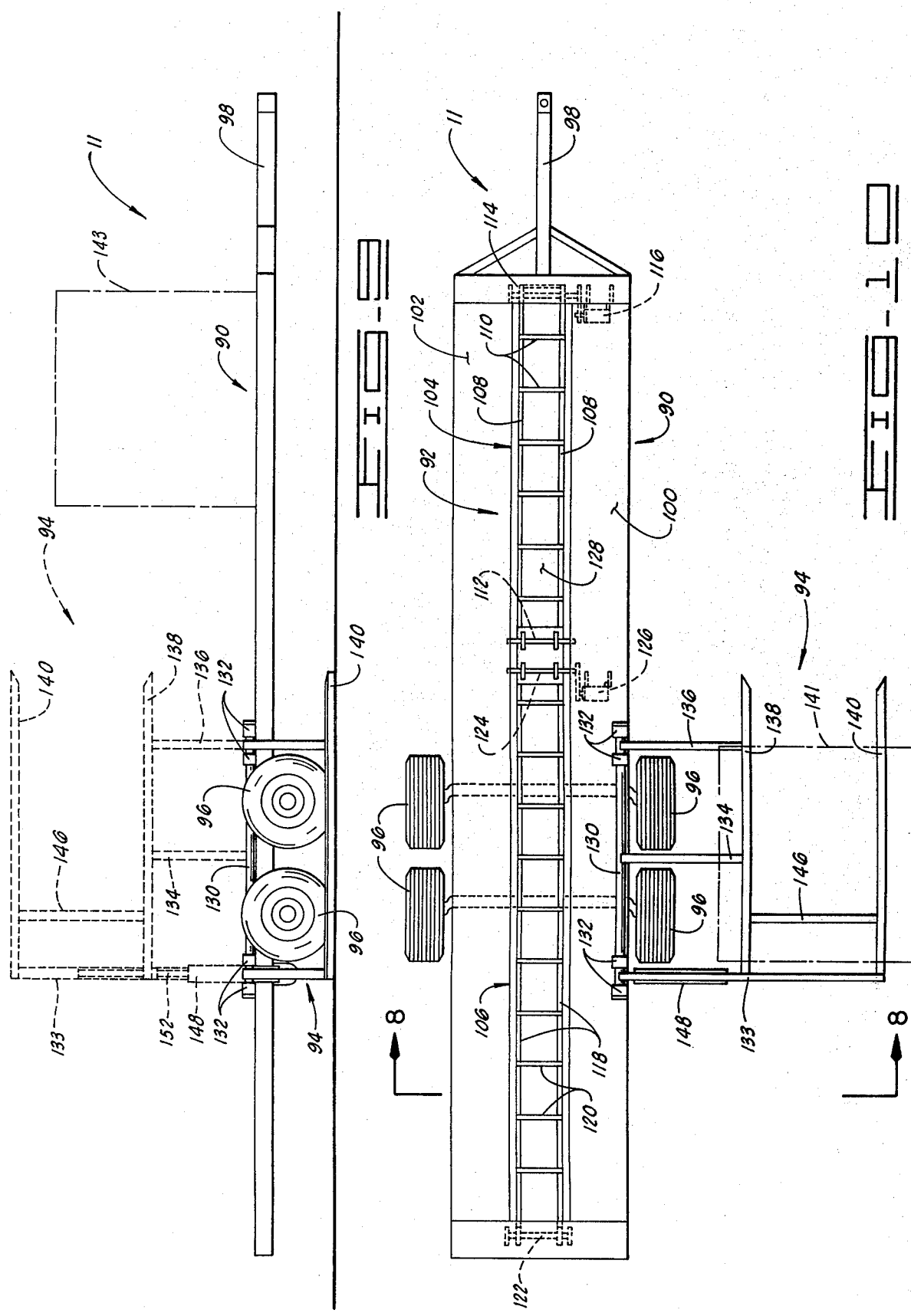

3,924,765

HYDRAULIC SIDE LIFT LOADER

BACKGROUND OF THE INVENTION

The invention is related to handling devices for generally cylindrical bales specifically a bale loader and carrier apparatus for picking up a bale transporting same and placing same. In the prior art numerous types of bale handling devices are known; however, these are constructed primarily for the handling, transporting, and placing of rectangularly shaped bales, such as bales of hay. No prior art device is known which is designed specifically for picking up large generally cylindrical bales of hay in the field and carrying a plurality of the bales for placing them on the ground in an orderly fashion at another location. Prior art bale handling devices use hydraulically powered lift apparatuses mounted on the bed portions of trucks with tiltable beds to pick up the rectangularly shaped bales of hay in the field and raise them to an elevation above the truck bed for moving them by hand to a stacked position on the truck bed. These known prior art bale handling and transportation devices are particularly adapted for the handling of rectangularly shaped bales of hay or other material which are of such a weight that a person on the truck bed can handle the bales and stack them; however, these devices are of no value in the handling of large generally cylindrical bales of hay which weigh on the order of 1,500 pounds each.

SUMMARY OF THE INVENTION

In the bale loader and carrier of this invention, it is comprised of a wheeled vehicle having a bed portion with a conveyor operably mounted on the bed portion for moving generally cylindrical bales along the bed portion. A frame is pivotally mounted on the wheeled vehicle, and it is pivotable from a generally horizontal position on one side portion of the vehicle where it is contactable with the ground to a generally upright position. One end portion of the frame is constructed to receive a generally cylindrical bale in a lifting position and when pivoted raise the bale onto the bed portion of the vehicle. In one preferred specific embodiment, the bale loader and carrier apparatus has the frame mounted on the forward end portion of the vehicle so as bales are loaded on the forward portion of the vehicle they move to the rear of the vehicle so it can carry a plurality of bales. In another embodiment the bale loader and carrier of this invention has the frame mounted in the center portion of the vehicle, in the wheel area thereof, and the conveyor is operable to move bales to the forward end portion of the vehicle and to the rear end portion of the vehicle.

One object of this invention is to provide a hydraulically operated side lift loader for loading and carrying generally cylindrical bales overcoming the aforementioned disadvantages of the prior art devices.

Another object of this invention is to provide a loader and carrier structure comprising a wheeled vehicle, such as a trailer, having a bed portion with a conveyor mounted on the bed portion and a frame mounted on the vehicle pivotal from a generally horizontal position alongside the vehicle to a generally upright position wherein the frame has one end portion constructed and adapted to receive a generally cylindrical bale in a lifting position with a portion of the frame underneath the bale.

Still, another object of this invention is to provide a loader and carrier for generally cylindrical bales having a hydraulically powered side lift apparatus mounted on the side of a forward portion of a vehicle to lift generally cylindrical bales from the ground onto a bed portion of the vehicle.

Yet, another object of this invention is to provide a bale loader and carrier for generally cylindrical bales having a hydraulically powered side lift mounted in a center portion of a wheeled vehicle to lift generally cylindrical bales from the ground onto the bed portion of the vehicle for transportation.

Yet, one other object of this invention is to provide a loader and carrier for generally cylindrical bales which has an elongated bed portion to receive and carry a plurality of large cylindrical bales of hay wherein a conveyor is provided on the vehicle bed for moving the bales on the bed and removing bales from the vehicle at one end portion thereof.

Various other objects, advantages, and features of the invention will become apparent to those skilled in the art from the following discussion, taken in conjunction with the accompanying drawings, in which:

DESCRIPTION OF THE DRAWINGS

FIG. 1 is a top plan view of an embodiment of the loader with the bale frame in a lowered position and having a bale shown in dashed lines on the bale frame;

FIG. 2 is a side elevation view of the embodiment of the loader shown in FIG. 1 with the bale frame in the raised position and having a bale shown in dashed lines on the bed;

FIG. 4 is a side elevation view of the stabilizer leg assembly for the loader shown in FIG. 1 with the leg shown in a partially extended position in solid lines and in the retracted position in dashed lines;

FIG. 6 is a top plan view of a conveyor drive assembly including the hydraulic motor, primary chain drive and a portion of a conveyor chain;

FIG. 7 is a top view of the rear end portion of the loader shown in FIG. 1 with the rail members attached to the rear of the trailer in position for unloading;

FIG. 8 is a top plan view of another embodiment of the loader with the bale frame shown in a lowered position and having a bale shown in dashed lines on the bale frame;

FIG. 9 is a side elevation view of the loader shown in FIG. 4 with the bale frame in the lowered position in solid lines and with the bale frame shown in a raised position in dashed lines, and having a bale shown in dashed lines on the bed;

FIG. 10 is a cross-sectional view of the embodiment of the loader shown in FIG. 4, the view taken on line 6-6 of FIG. 4 and with the bale frame shown in a raised position in dashed lines and having a bale shown in dashed lines on the bed.

Figure 3:
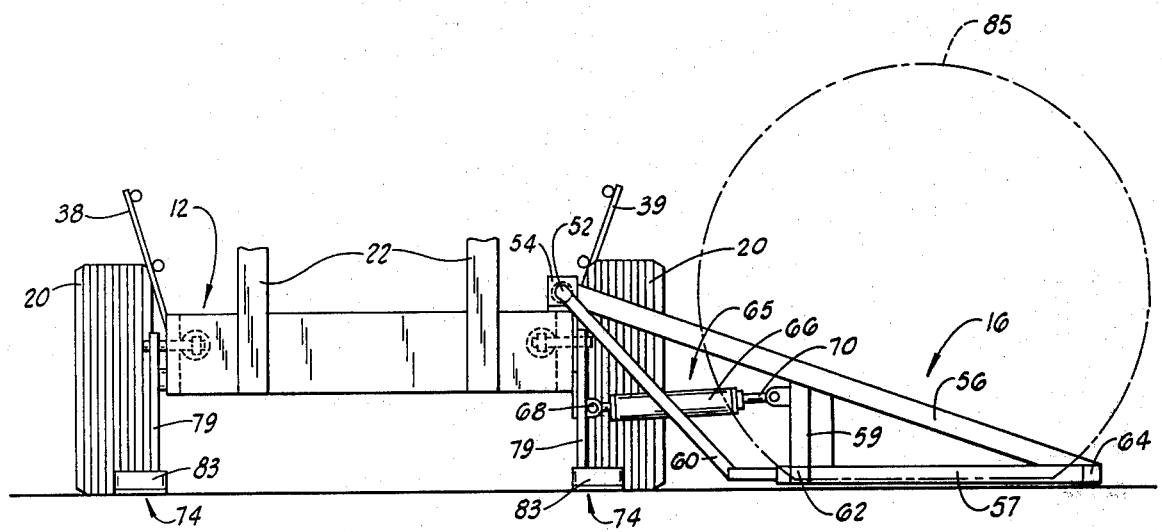
FIG. 3 is a sectional view of the embodiment of the loader shown in FIG. 1, the view taken on line 3—3 of FIG. 1 having the bale frame in a lowered position in solid lines with a bale thereon in dashed lines and further having the bale frame shown in a raised position in dashed lines.
Figure 5:
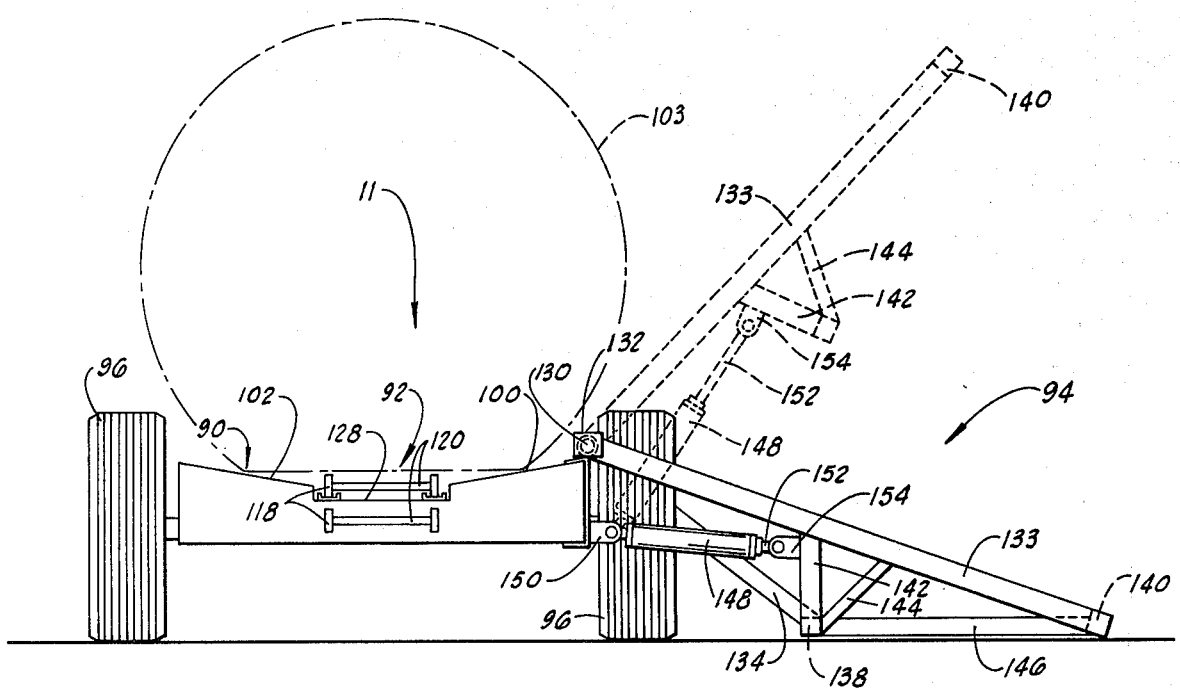
FIG. 5 is a top plan view of the stabilizer leg assembly shown in FIG. 4.

The following is a discussion and description of preferred specific embodiments of the loader structure of this invention, such being made with reference to the drawings, whereupon the same reference numerals are used to indicate the same or similar parts and/or structures. It is to be understood that such discussion and description is not to unduly limit the scope of the invention.

DESCRIPTION OF EMBODIMENTS

The hydraulic side lift loader of this invention is shown and described herein in two embodiments thereof. One embodiment, of the loader of this invention is shown in FIGS. 1–7 and generally indicated at 10. Another embodiment, 2, of the loader of this invention is shown in FIGS. 8–10 and generally indicated at 11. The structure of the two embodiments of this invention are generally structurally similar differing most in the position of the bale loading frame portion of the apparatus. Both embodiments of the hydraulic side lift loader disclosed herein are generally similar in that they include an elongated wheeled vehicle, specifically a trailer, with a conveyor mounted longitudinally through the center portion of the trailer's bed portion. A frame is pivotally mounted on a side portion of the wheeled vehicle or trailer and pivotable from a generally horizontal position in contact with the ground to an upright position. The frame is constructed to receive a generally cylindrical bale in a lifting position, with a portion of the frame underneath the bale. When the bale is raised it will roll onto the bed portion of the vehicle. The conveyor on the bed portion moves the bale longitudinally on the bed portion so a plurality of bales can be carried on the vehicle. Bales are removed from the vehicle by the conveyor as they are moved to the end of the bed portion.

Referring to the drawings in detail and in particular to FIGS. 1–7, an embodiment, 1, of the loader structure of this invention is illustrated and indicated generally at 10. The loader 10 of this invention includes a wheeled vehicle, having a bed portion 12 with a conveyor 14 mounted thereon and further having a bale lifting apparatus 16 pivotally mounted on the wheeled vehicle on the side of the forward portion thereof. The wheeled vehicle is preferably an elongated trailer as shown in the drawings. The conveyor 14 is mounted in the center portion of the elongated bed portion 12 of the trailer and extends the length thereof for use in moving bales from the forward end portion of the bed portion 12 rearward and off of the rear end of the trailer needed for unloading. The bale lifting apparatus 16 is pivotally mounted on the forward end portion of one side of the trailer. A guard rail-like structure 18 is mounted on opposite sides of the trailer.

The wheeled vehicle or trailer has the bed portion 12 thereof substantially elongated as shown in the drawings with its wheels 20 mounted in the center portion of the trailer. A tongue goose neck type assembly 22 extends from the forward end of the trailer for coupling such with a towing vehicle such as a tractor or a pickup having a bed mounted hitch. The trailer's bed portion 12 has opposed planar side portions 24 and 26 on its upper surface on opposed sides of the conveyor 14. The trailer is a frame construction covered by the side portions 24 and 26 and open in its center portion with cross braces being visible between the side portions in FIG. 1. FIG. 3 shows the bed portion's upper sides 24 and 26 in their relation to the conveyor 14. The bed sides 24 and 26 are preferably constructed flat or essentially horizontal relative to the conveyor 14 as shown. In practice it has been found that with the bed portion's sides 24 and 26 constructed sloping downward in the direction of the conveyor 14 so the sides 24 and 26 provide a trough-like resting surface to reduce the tendency of a bale to shift position laterally or roll when loaded.

The conveyor 14 is preferably the endless belt type having a pair of so-called endless belts. Specifically, the preferred conveyor 14 has a pair of chains 27 and 28 on its opposite sides which move independently. The chains 27 and 28 run in the center portion of the vehicle's bed portion 12 at the inner edges of the bed sides 24 and 26. The conveyor chains 27 and 28 are individually supported by sprockets at their ends and they are individually powered. At the forward end of the bed 12 a pair of sprockets 29 and 30 support the forward end of the conveyor chains 27 and 28, respectively. At the rear of the bed 12 the conveyor 14 has a pair of conveyor chain drive assemblies 31 and 32 connected with the chains 27 and 28, respectively for supporting the rear end of the chains and providing power for moving them. The conveyor chain drive assemblies 31 and 32 have a reversible hydraulic motors 33 and 34, respectively, connected by a primary chain drive with output sprockets 35 and 36, which mount the chains 27 and 28, respectively. The hydraulic motors 33 and 34 are powerable from the auxiliary hydraulic power take off system of a towing vehicle such as a tractor and are preferably operated simultaneously so the chains 27 and 28 will be moved at essentially the same speed.

FIG. 6 shows an enlarged top view of the conveyor chain drive assembly 31. The motor 33 is mounted on a beam member that is slidably mounted with the frame of the trailer and movable in a longitudinal direction. A primary drive chain assembly connects the motor 33 to an idler shaft assembly that is mounted on the end portion of the slidable beam. Sprocket 35 is mounted on the output of the idler shaft assembly. A chain tension adjustment has a threaded member mounted with the trailer frame that engages in a socket like fixture on the slidable beam structure as shown. Tension of the chain 27 is adjusted by turning the threaded member which in turn moves the beam in or out relative to the frame of the trailer until the proper tension is achieved. Both of the conveyor chain drive assemblies 31 and 32 are constructed similarly to position the chains 27 and 28 in the open inner portion of the trailer's bed 12. The sprockets 29, 30, 35, and 36 are preferably larger in diameter than the thickness dimension of the bed's frame so the chains 27 and 29 will pass over and under the bed frame structure. The chains 27 and 28 are preferably roller chains with lugs 37 secured thereto at regular spaced intervals. The lugs 37 are attached, preferably by welding, to individual links of the chains on what is the exterior of their loop around the sprockets so they will contact a bale on the bed. The lugs 37 are cross-sectionally arcuate or curved with their ends being secured to the sides of a chain link. Preferably, the lugs 37 extend substantially above the link so they do not interfere with the sprocket teeth and they extend substantially the length of the link to which they are attached. In use the lugs 37 enable the conveyor 14 to securely grip a bale by pressing into it thus preventing it from slipping on the conveyor 14 as it is moved. In practice in using the loader 10 in handling twine bound bales of hay. It has been found that the lugs 37 do not cut the twine binding of the bale and they prevent the bale from slipping on the conveyor 14 as it is moved.

The guard rail-like structure 18 is secured to the outer side of the bed 12. The guard rail 18 has elongated members 38 and 39 that extend substantially the length of the trailer and are supported above and slightly outward of the bed's outer sides by brace members extending from the side of the trailer's frame. The guard rail 18 in operation prevents a bale from rolling off of the side of the trailer. The forward portion of rail 38 is opposite to the bale lifting apparatus 16 and it prevents a bale from being rolled off of the bed 12 when it is loaded onto the vehicle.

FIGS. 1, 2, and 3 clearly show the bale lifting apparatus structure 16. The bale lifting apparatus 16 has a fork-like frame structure pivotally secured to the side of the trailer. A bar member 52 attaches the fork-like frame structure to the trailer; it is pivotally supported in a plurality of mounts 54 which allow it to rotate relative to the bed 12. A plurality of fork support members 55, 56, 58, and 60 extend from the bar member 52 for supporting and mounting the fork tines 62 and 64. The fork tines 62 and 64 are open in the direction of the forward end portion of the trailer and they are supported on the frame structure as shown in the drawings. Fork support members 58 and 60 are secured to the innermost tine 62. Fork support member 56 is secured to the outermost tine 64 with support member 55 being secured to support member 56 as a brace. A rear fork support member 57 joins the rear end portions of the tines 62 and 64 as shown in FIG. 3, below the outer end portion of support member 56. Another tine support member 59 joins the rear end of tine 62 at support member 57 and extends to a midportion of support member 56.

A hydraulic cylinder and piston apparatus, indicated generally at 65, is mounted between the trailer frame and the bale lifting apparatus 16 to raise and lower the fork-like frame. The cylinder and piston apparatus 65 is positioned generally below the support member 56 and has the cylinder 66 pivotally attached to a mount 68 on the side of the trailer frame with the piston 70 being pivotally attached to the fork tine support member 59. Extension of the piston 70 from the cylinder 66 rotates the bale lifting apparatus from the ground contact position shown in the solid lines of FIG. 3 to a raised position as the bar member 52 pivots in the mounts 54. When the bale lifting apparatus is raised then retraction of the piston 70 into the cylinder 66 lowers the fork-like frame. The cylinder 66 can be connected with the hydraulic auxiliary power take off system of a towing vehicle such as a tractor by hoses or the like so it can be operated remotely by the vehicle operator.

A pair of stabilizer leg assemblies, indicated generally at 74, are mounted on the forward portion of both sides of the trailer or wheeled vehicle. Each stabilizer leg assembly 74 includes a piston and cylinder apparatus mounted on the trailer's frame and connected by a linkage to a ground contact member. Both of the stabilizer leg assemblies 74 are constructed similarly. One stabilizer leg assembly is shown in detail in FIGS. 4 and 5. The piston and cylinder apparatus is mounted adjacent to the inside of the trailer's outer frame member, the frame member is indicated at 75 in FIGS. 4 and 5 only. The cylinder 76 is pivotally mounted on the frame member 75 and the piston 77 is pivotally attached to one arm member 78 of the linkage supporting the ground contact member. The linkage is a crank-like structure with the arms 78 and 79 joined by a shaft that is supported in a mount 80 transverse to the trailer's frame member 75. As shown the mount 80 is below the frame 75 with the arm 79 being on the exterior of the trailer's frame and arm 78 on the interior of the trailer's frame. Stop members 81 and 82 are secured to the frame portion 75 and limit pivotal movement of arm member 78 which in turn limits movement of arm member 79 and movement of the ground contact member 83. The ground contact member 83 is pivotally mounted on the end of arm member 79 as shown. Preferably, the ground contact member 83 is a generally shoe-like member constructed with a curved bottom portion and upturned edge portions as shown; however, it is to be understood that it can be replaced by other structurally different ground contact members, for example, a caster wheel or the like. When the piston 77 is retracted into the cylinder 76, the arm 79 is positioned essentially parallel with the frame member 75. When the piston 77 is fully extended from the cylinder 76, arm member 78 contacts stop member 82 with arm member 79 being essentially vertical as shown in FIG. 2. The curved bottom of the ground contact member 83 along with its pivotal attachment on the arm member 79 will allow it to slide on the ground should it be left in the extended position in contact with the ground when the loader 10 is moved in a forward direction or in a rearward direction should the operator inadvertently forget to raise it. Preferably, the loader 10 is provided with a pair of the stabilizer leg assemblies 74 with the cylinders thereof connected to the hydraulic auxiliary power take off system of the towing vehicle with the cylinders being connected to be operated simultaneously. In practice it has been found that a pair of the stabilizer leg assemblies 74 provide stability for the loader 10 when a bale is being lifted onto the bed due to the off-center weight distribution as the bale is being raised and as a stabilizer to prevent undue twisting of the trailer when the bale rolls onto the bed. It is to be understood that the loader 10 can be constructed with only one stabilizer leg assembly being provided on the bale lifting apparatus side of the trailer to stabilize the trailer as a bale is being lifted.

In use and operation of the hydraulic side lift loader 10 of this embodiment, 1, of this invention, it is coupled with a towing vehicle such as tractor or the like having a hydraulic power takeoff system. When the loader 10 is hitched to a tractor or the like the hydraulic motors 33 and 34 and the hydraulic cylinders 66 and 76 are connected with the hydraulic power takeoff system of the towing vehicle. When the trailer is pulled by the tractor or towing vehicle, the bale lifting apparatus 16 is placed in the raised position as shown in FIG. 2 and the stabilizer leg assemblies 74 have their ground contact members 83 raised from the ground to an elevated position. When it is desired to pick up a generally cylindrical bale with the bale loader 10, the bale lifting apparatus 16 is placed in the position shown in FIGS. 1 and 3 with the fork tines 62 and 64 being on or closely adjacent to the ground and the ground contact members 83 being in contact with the ground. When a bale is to be picked up the fork tines 62 and 64 are positioned on adjacent sides of a bale 85 as shown in FIGS. 1 and 3. Normally, a bale of hay is picked up when it is lying on its side in the field. With the bale lifting apparatus in the lowered position the trailer is pulled forward so the tines 62 and 64 are positioned on opposite sides of the bale with the rear of the bale being in a position adjacent to the member 56. The piston and cylinder apparatus 65 on the bale lifting apparatus 16 has the piston 70 extended from the cylinder 66 to rotate the fork-like frame in an upward motion. Slowly raising the fork-like frame upward causes the bale to roll over the tine support members 58 and 60 onto the trailer's bed portion 12. The forward end portion of guard rail 38 prevents the bale from rolling off of the trailer when loaded. Once a bale has been placed on the trailer's bed portion 12, the bale lifting apparatus is lowered and the conveyor 14 can be operated to move the bale rearward. A bale 87 is shown in FIG. 2 in a position rearward of the position where it is placed on the bed. As a bale is moved rearward on the trailer's bed 12 the guard rail structure 18 centers it on the bed, thus preventing it from inadvertently rolling off. In carrying a plurality of bales with the loader 10 of this invention, the bales are placed on the conveyor 14 in an end-to-end relationship as the conveyor 14 moves the bales toward the rear of the trailer.

Unloading of the bales from the loader is a simple process in that the bales can be moved from the rear of the bed portion by operation of the conveyor. In practice it has been found convenient to position the trailer at the point of one end of the line or row where the bales are to be placed. Prior to unloading the bales from the loader, a pair of rail members 88 and 89 are attached to the rear of the trailer's bed portion 12 as shown in FIG. 7. The rail members 88 and 89 are temporarily attached to the rear of the bed as shown to serve as a slide in guiding the first bale off of the rear of the trailer. The rail members 88 and 89 are elongated beam-like members similarly constructed with each having a hook on one end thereof engagable in slots at the rear portion end of the bed portion 12 or in slots in the trailer's frame. In practice it has been found the first bale unloaded from the rear of the trailer has a tendency to tip and can be unloaded without the rail members; however, the use of the rail members 88 and 89 is preferred to prevent tipping of the first bale. It is to be noted that in practice it has been found that tipping of the first bale to be unloaded can cause the bale binding twine or wire to be cut by the conveyor 14 and use of the rail members obviates the possibility of cutting the bale binding. To unload the bales the towing vehicle is placed in a neutral gear and the conveyor 14 is operated to move the bales from the rear end of the trailer's bed portion 12. Operating the conveyor in this manner will move the bales from the end of the trailer one by one while at the same time pushing the trailer along with its towing vehicle in a forward direction leaving the plurality of bales in a closely packed end-to-end row when the unloading process is finished. In practice it has been found that the described unloading procedure of forcing the bales into the end-to-end relationship will allow bales of hay to have very good water shedding characteristics.

Another embodiment, 2, of the hydraulic side lift loader of this invention is shown in FIGS. 8–10 of the drawings and indicated generally at 12. The loader 11 of this embodiment, 2, of this invention includes a wheeled vehicle having a bed portion 90 with a conveyor 92 mounted thereon and further having a bale lifting apparatus 94 pivotally mounted on the wheeled vehicle on the side thereof. The wheeled vehicle is preferably an elongated trailer as illustrated in the drawings. The conveyor 92 is mounted in the center portion of the elongated bed portion 90 of the wheeled vehicle or trailer and it extends the length thereof for use in moving the bales on the bed portion 90 from the place on the bed portion where they are deposited by the bale lifting apparatus 94. The conveyor 92 additionally functions to remove the bales from the rear end of the trailer in an unloading process. The bale lifting apparatus 94 is pivotally mounted on a mid portion of one side of the trailer in the portion thereof where the wheels of the trailer are mounted.

The wheeled vehicle or trailer has the bed portion 90 thereof substantially elongated relative to its width as illustrated in the drawings with the wheels 96 mounted on the center portion of the trailer. A tongue assembly 98 extends forward from the front end of the trailer for coupling the trailer with a towing vehicle such as a tractor. The trailer's bed portion 90 has opposed planar side portions 100 and 102 on its upper, generally horizontal surface on opposite sides of the conveyor 92. FIG. 10 shows the bed portion's upper sides 100 and 102 in their relation to the conveyor 92. In practice it has been found that with the bed portion's sides portions 100 and 102 sloping downward in the direction of the conveyor 92, the sides 100 and 102 provide a trough-like resting surface for a bale and thus reduce the tendency of a bale to shift its position laterally or roll when loaded. It is to be noted that the trailer's bed portion 90 can be constructed to be substantially horizontally flat without departing from the scope of the invention and in such construction an upright guard rail structure or the like can be added to the side edges of the bed to prevent bales from rolling off of the bed.

The conveyor 92 is preferably the endless belt type conveyor and it is constructed along with the trailer. The conveyor 92 is constructed in a pair of separate conveyor units, a forward conveyor portion 104 and a rear conveyor portion 106 which function to convey bales forwardly and rearwardly from the unloading point of the bale lifting hydraulic 94. Both of the conveyor portions 104 and 106 are constructed similarly in that the conveyor belt has Both pair of chains on opposed sides thereof connected by transversely positioned slats. It is to be understood the slotted conveyor shown with this embodiment, 2, of the loader can be replaced by the dual belt conveyor as disclosed with the first embodiment, 1, of the loader. In the forward conveyor portion 104 the chains are indicated at 108 and the slats at 110, with the conveyor belt running on a pair of sprocketed rollers 112 and 114 on opposite ends of the conveyor belt. A reversible hydraulic motor 116 is connected with the forward sprocketed roller 114 on the forward conveyor portion 104 for moving the forward slatted conveyor belt. In the rear conveyor portion 106 the chains are indicated at 118 and the slats are indicated at 120. The rear conveyor belt is supported on a sprocketed roller 122 at the rear of the trailer bed and another sprocketed roller 124 at the mid portion of the trailer bed with a reversible hhydraulic motor 126 being connected with the sprocketed roller 124 to facilitate movement of the rear slatted conveyor belt. both segments of the conveyor 92 on their upper portion run on a center floor portion 128 of the vehicle's bed portion 90 with the chains 108 and 118 running in tracks secured to the floor portion 128. The slats 110 and 120 are secured transversely between the individual links of the chains 108 and 118, respectively, and the slats are positioned to be above the tracks supporting the chains. FIG. 10 shows in a cross-sectional view the relation of the conveyor 92 in the vehicle's bed portion 90 including the center floor portion 128 and the rear conveyor portion chains 118 and slats 120. The function of the center floor portion 128 is to prevent portions of a bale which is between the slats of the conveyor from deforming and extending or being pressed downward through the conveyor between the slats. In practice it has been found that the center floor portion prevents extensive deformation of a bale and provides for easier movement of the bale on the vehicle's bed portion 90 in addition to easier removal from the bed portion.

The bale lifting apparatus 94 of the loader is mounted on the mid portion of the trailer spanning the wheels 96 on one side thereof as shown in FIGS. 8–10. The bale lifting apparatus 94 has a frame structure pivotally mounted on the side of the trailer with the frame having a fork-like outer portion. The frame of the bale lifting apparatus 94 has a bar member 130 attached to the side of the trailer in a plurality of mounts 132. A plurality of members 133, 134 and 136 extend from the bar member 130 for supporting and mounting the tines 138 and 140 of the lifting apparatus' fork portion which is on its outer end portion. The fork tines 138 and 140 are open in the direction of the forward end portion of the trailer and they are supported in a rigid position on the lifting apparatus 94. Member 133 extends from the bar member 132 and has tine 140 secured to its outer end. Members 134 and 136 extend from the bar member 130 and are secured to the inner tine 138. A tine support member 142 extends from the rearwardmost member 133 and is secured to the rearward end portion of the inner tine member 138. A brace member 144 connects the tine support member 142 with the member 133. A fork brace member 146 connects the tines 138 and 140 at their rear end portion. A hydraulic cylinder and piston apparatus is preferably used to raise and lower the frame and fork portion of the bale lifting apparatus. This piston and cylinder apparatus has a cylinder 148 pivotally supported in a mount 150 on the side of the trailer with the piston 152 pivotally supported in a mount 154 on the upper portion of the tine support member 142. When the piston and cylinder apparatus is retracted the frame of the bale lifting apparatus is positioned on the ground as shown in FIG. 10 with the fork tines 138 and 140 at or closely adjacent to ground level. When the piston and cylinder apparatus is extended the fork portion of the bale lifting apparatus 94 is rotated to a raised position such as is shown in the dashed lines of FIG. 10. Complete extension of the piston and cylinder apparatus moves the frame portion of the bale lifting apparatus 94 to a substantially vertically oriented position extending upward from the side portion of the trailer's bed.

In the use and operation of the hydraulic side lift loader 11 of this embodiment, 2, of this invention, when it is desired to be used it is coupled with a towing vehicle, such as a tractor, and the hydraulic motors 116 and 126 and the hydraulic cylinder 148 are communicably connected with the hydraulic power takeoff system of the tractor or towing vehicle. When the trailer is pulled by a tractor the bale lifting apparatus 94 is placed in the raised position. When it is desired to pick up a generally cylindrical bale with the loader, the bale lifting apparatus 94 is placed in the lowered position as shown in the drawings with the fork tines 138 and 140 on or closely adjacent to the ground. Once the fork tines are positioned on or closely adjacent to the ground the trailer is pulled forward to position the fork tines adjacent to the sides of a bale 141 as shown in FIG. 8. Normally, a bale of hay is picked up when it is lying on its side in the field. Once the fork tines are adjacent to the sides of the bale and the rear of the bale is in the rear portion of the lifting apparatus' fork portion, the piston 152 of the piston and cylinder apparatus is extended which rotates the lifting apparatus frame upward to a raised position. Once the bale lifting apparatus frame is raised sufficiently, the bale will roll over the members 134 and 136 onto the bed portion 90 of the trailer. It is to be noted that the wheels 96 opposite to the bale lifting apparatus 94 extend above the vehicle's bed portion 90, thus functioning to prevent a bale from rolling off the side of the trailer opposite to the bale lifting apparatus as it rolls from the bale lifting apparatus. The sloping upper side portions 100 and 102 of the trailer's bed portion 90 function generally to center the bale over the conveyor 92. A bale 103 is shown in FIG. 10 in position with the conveyor 92 on the bed portion 90. Once a bale has been placed on the trailer's bed portion the bale lifting apparatus is lowered and the conveyor is operated to either move the bale to the forward end portion of the trailer or to the rear end portion of the trailer as needed. Preferably, when the first of a plurality of bales is loaded on the trailer, they are moved to the forward end portion of the trailer by both of the conveyor segments 106 and 104. A bale 143 is shown in FIG. 9 on the forward portion of the bed. Once the forward portion of the trailer is filled with bales, they are moved to the rear of the trailer one at a time in a line as they are loaded. In carrying a plurality of bales with the loader 11 of this embodiment of this invention, the bales are placed on the conveyor in and end-to-end relationship. Unloading a plurality of bales from the loader 11 of this invention is a simple process in that the bales can be moved from the rear end of the bed portion 90 by operation of the conveyor 92. In practice it has been found convenient to position the trailer at the end point of one end of a line where the bales are to be placed, then the towing vehicle is placed in a neutral gear and the conveyor, including both segments 104 and 106 thereof is operated to move the bales off of the rear end of the trailer's bed portion. Operating the conveyor in this manner will move the bales from the rear end of the trailer one at a time while at the same time pushing the trailer or wheeled vehicle and the tractor or towing vehicle in a forward direction leaving the plurality of bales in an end-to-end line or row when the unloading process is finished. In practice it has been found that the described unloading procedure by forcing the bales into the end-to-end relationship will allow the bales of hay to have very good water shedding characteristics and require a minimum of space for their storage.

In the manufacture of the hydraulic side lift loader in the two embodiments, 1 and 2, of this invention disclosed herein, it is obvious that the loader can be easily constructed to achieve the end product. The loader structure is basically simple in construction and it has relatively few moving parts. The wheeled vehicle shown in the drawings is a trailer; however, it is to be understood that the wheeled vehicle can be manufactured as a self-propelled vehicle as well as a trailer. The conveyor portion of the apparatus can be constructed with the bed of the vehicle in the form disclosed having chains with transversely mounted slats or such can be a different type of conveyor structure; for example an endless web-like belt having attached bar-like members or upwardly extending protrusions. In general, the loader apparatuses of this invention can be constructed by techniques similar to those currently used in the manufacture of farm machinery, particularly bale handling equipment.

In the use and operation of the hydraulic side lift loader of this invention for carrying generally cylindrical shaped bales of this invention, it is seen that same provides a loader and transporter or carrier which can pick up bales of hay in the field, load them onto the wheeled vehicle for transportation to a storage point and unload the bales from the vehicle. The loader of this invention will carry a plurality of bales laid on the bed portion thereof in an end-to-end relationship with the bales lying on their side and unload the bales in a similar end-to-end line on the ground. Both embodiments of the loader shown and described herein function similarly to pick up bales such as bales of hay in the field, load them onto the vehicle and transport them to a point for unloading. The specific operation of the two embodiments of the loader shown and described herein differs only in the use of the stabilization leg on the first described embodiment which is not present on the second described embodiment and in the use of a two-segment conveyor on the second embodiment which is not present on the first embodiment.

As will become apparent from the foregoing description of the applicant's hydraulic side lift loader structure, relatively simple means have been provided to load, transport, and unload large generally cylindrically shaped bales, such as bales of hay. The loader structure is economical to use in that it can carry a plurality of bales and unload them rather quickly. The structure is simple to use in that only two controls are necessary to operate the lifting apparatus and operate the conveyor.

While the invention has been described in conjunction with preferred specific embodiments thereof, it will be understood that this description is intended to illustrate and not to limit the scope of the invention, which is defined by the following claims.

I claim:

1. A loader and carrier for large, heavy, generally cylindrical bales of hay, or the like comprising:
   a. a vehicle having an elongated bed having a retaining cradle for a plurality of said bales end-to-end substantially throughout its length,
   b. a conveyor operably mounted on said bed constructed and adapted to move one of said bales along said retaining cradle, said conveyor mounted on said retaining cradle and bed and communicating therebetween,
   c. means connected to said conveyor means to operate same,
   d. a lifting cradle for said bale having a fork portion to receive and retain said bale between the tines thereof and pivotally mounted on the side of said vehicle and extending outwardly therefrom, said lifting cradle being pivotal from a generally horizontal and bale receiving position at a side of said vehicle to a generally upright and bale discharge position adjacent said retaining cradle,
   e. means connected to said vehicle and lifting cradle constructed and adapted to pivot same,
   f. said lifting cradle having spaced portions to receive and retain thereon in lifting relation one of said bales, said loader and carrier being constructed and adapted to receive one of said bales on said lifting cradle, lift same onto said retaining cradle on said bed when said lifting cradle is pivoted to said generally upright position, and said conveyor being constructed and adapted to move said bale along said retaining cradle and to one end portion of said bed.

2. The loader and carrier of claim 1, wherein:
   said conveyor has an endless belt like member extending between the forward end portion of said vehicle and the rear end portion of said vehicle.

3. The loader and carrier of claim 2, wherein:
   said conveyor is communicably connected with the rear end portion of said bed to in operation move one of said bales off of said bed at the rear thereof.

4. The loader and carrier of claim 3, wherein:
   a. said vehicle is a wheeled trailer, and
   b. said lifting cradle is mounted on the forward end portion of said trailer.

5. The loader and carrier of claim 4, wherein, said vehicle has a downwardly extendable stabilizer mounted thereon on the same side portion of said vehicle as said lifting cradle and said stabilizer being extendable to a ground contacting position for laterally stabilizing said vehicle when said lifting cradle is operated for lifting a bale.

6. The loader and carrier of claim 5, wherein:
   a. said conveyor has a pair of endless belt like members mounted in a parallel and spaced relation, in a center portion of said bed portion, and
   b. said stabilizer has a ground contact member movable between a ground contact position and a raised non-ground contact position.

7. The loader and carrier of claim 3, wherein:
   a. said vehicle is a wheeled trailer,
   b. said lifting cradle is mounted on a mid portion of said vehicle, and
   c. said conveyor has a forward conveyor portion extending from a mid portion of said trailer to the forward end portion of said trailer and said conveyor means has a rear conveyor portion extending from a mid portion of said trailer to the rear end portion of said trailer.

8. The loader and carrier of claim 7, wherein:
   a. said trailer has the wheels thereof mounted in a mid portion thereof, and
   b. said lifting cradle is mounted straddling the trailer wheels.

* * * * *